(12) United States Patent
Suzuki et al.

(10) Patent No.: US 6,343,867 B1
(45) Date of Patent: Feb. 5, 2002

(54) SPREAD ILLUMINATING APPARATUS

(75) Inventors: Shingo Suzuki; Masafumi Okada; Koichi Toyoda, all of Asaba-cho (JP)

(73) Assignee: Minebea Co., Ltd., Miyota (JP)

( * ) Notice: Subject to any disclaimer, the term of this patent is extended or adjusted under 35 U.S.C. 154(b) by 0 days.

(21) Appl. No.: 09/502,785

(22) Filed: Feb. 11, 2000

(30) Foreign Application Priority Data

Feb. 24, 1999 (JP) ............................................. 11-046495

(51) Int. Cl.$^7$ ................................. F21V 7/00; F21V 8/00
(52) U.S. Cl. ......................... 362/31; 362/551; 362/558; 362/331
(58) Field of Search ............................. 362/551, 31, 26, 362/339, 330, 332, 27, 558, 331; 385/146, 901

(56) References Cited

U.S. PATENT DOCUMENTS 5,712,694 A * 1/1998 Taira et al. ..................... 349/9
5,926,601 A * 7/1999 Tai et al. ..................... 385/146

FOREIGN PATENT DOCUMENTS

| JP | 10-182076 | 7/1998 |
| JP | A-10-182076 | 7/1998 |

* cited by examiner

*Primary Examiner*—Thomas M. Sember
(74) *Attorney, Agent, or Firm*—Oliff & Berridge, PLC

(57) ABSTRACT

At one end of the spread body 1, two light conductive members 2A, 2B on one part of which optical path conversion means 4 are formed are disposed in line with the spread body 1 and each optical path conversion means 4 of the light conductive members 2A, 2B is, when seeing perpendicularly to the spread body 1, disposed alternately with each other. Since each optical path conversion means 4 of the light conductive members 2A, 2B is not impeded with other optical path conversion means 4, illumination is carried out effectively.

6 Claims, 6 Drawing Sheets

F I G. 5
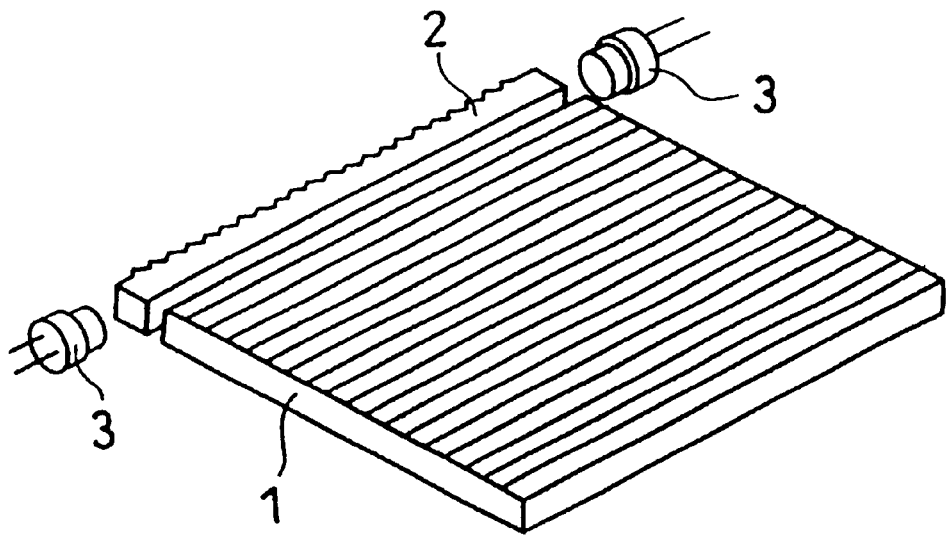
F I G. 6
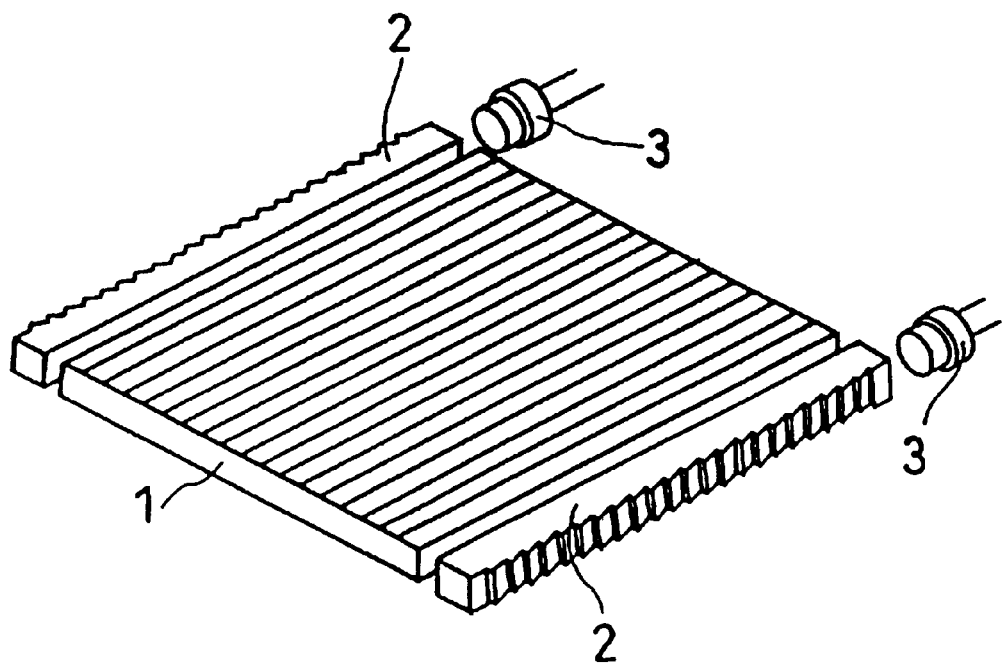

SPREAD ILLUMINATING APPARATUS

BACKGROUND OF THE INVENTION

1. Field of the Invention

The present invention relates to a spread illuminating apparatus for use of illuminating a display portion of a personal computer and word processor (hereinafter referred to as "person com.").

2. Description of Related Arts

As a display for person com., a cathode ray tube (so called picture tube) has been mainly used, however since this type is large-size, heavy weight and high energy consumption, recently a liquid crystal panel has been used very much. Accordingly, what is much in number of picture elements has been developed, and in addition since the elements for circuitry have been developed in miniaturization, for instance a so-called note-book type of person com. and such miniaturized one has been rapidly developed.

Thus, a demand for a liquid crystal panel has been increased rapidly, on the other hand, since the liquid crystal panel itself does not emit the light, an illuminating apparatus is needed for that purpose. Conventionally, as this kind illuminating apparatus, a cold cathode fluorescent lamp (CCFL) or a hot cathode fluorescent lamp (HCFL) has been used. Since these are, in any type, discharge lamps, a high voltage is necessary when making them discharge between electrodes. Accordingly, an oscillation circuit using semiconductors has been provided and a high voltage generated by the oscillation circuit has been supplied.

Since the person com. is a medley of electric circuits and electric apparatuses, it has to consume energy by itself. Therefore, an energy saving technology has been developed, at present, what has been highly developed in energy saving compared with the conventional ones has been prevailed. In particular, in a portable person com. such as so-called note book type, such tendency has outstanding. However, if energy consumption is large in its illuminating apparatus, most energy of battery has to be consumed by that.

Accordingly, without using a fluorescent lamp, in place of that, what is used with a light emitting diode in white has been developed, of which a patent application has been already filed by the present applicant (Patent application No. Hei 10-182076). One example of this type is explained based on FIG. 5. A spread body 1 is rectangular in configuration, on one end thereof, a bar-like light conductive member 2 is disposed. This light conductive member 2 is separated from the spread body 1 in FIG. 5, but in an actual one, it is tightly in contact with the spread body 1 so as to lead the light to the spread body 1 effectively. On one portion of the light conductive member 2 an optical path conversion means is provided.

On both sides of the light conductive member 2, light emitting diodes (LED) 3,3 as a light emitter are disposed. This light emitting diode 3 is also separated from the light conductive member 2 in figure, actually it is tightly in contact with the light conductive member 2. An emitting color of the light emitting diode 3 is white, when electric energy is supplied and the light is emitted from the diode, so as to direct most of the light toward the light conductive member 2, the diode 3 is adapted to be surrounded with a case etc. In this construction, when these light emitting diodes 3, 3 emit, that light directs to the spread body 1 through the light conductive member 2 and illuminates it.

What is illustrated in FIG. 6 is a variation example, on both ends of the spread body 1, light conductive members 2A and 2B are provided and on one end of each light conductive member 2 a light emitting diode 3 is disposed. In this construction, since the spread body 1 receives light from both sides, it can be illuminated uniformly. What is shown in FIG. 7 is also a variation example. In this case, it is a case where, from a viewpoint of layout, the light conductive members 2A, 2B are not able to be disposed on both sides of the spread body 1, two light conductive members 2A and 2B are disposed on one side of the spread body 1. In this case, the light from the light conductive member 2B which is located at a separated position seeing from the spread body 1 reaches to the spread body 1 through the light conductive member 2A which is located close to the spread body 1.

In each structure explained above, the light conductive member 2 (2A, 2B) is formed with an optical path conversion means as mentioned above. As the optical path conversion means, there have been what is partially made by roughened on the surface thereof, what is applied with a white paint on the surface thereof, what is partially provided with prism-shaped portions on the surface thereof and what is totally roughened on the surface thereof. In any one of them, if the positions where the optical path conversion means of the two light conductive members 2 (2A, 2B) are provided are not appropriate, the light from the light conductive member 2B which is located far from the spread body 1 is refracted to undesirable direction under the influence of the optical path conversion means of the light conductive member 2A, which causes to generate a problem to decrease the illumination efficiency.

FIG. 8 is for explanation of what is adapted to form an optical path conversion means 4 by roughening one portion of the surfaces of the light conductive members 2A, 2B. In this case, since the positions of the optical path conversion means 4, 4 of the light conductive members 2A, 2B are not appropriate, although the light 5 (center light) of the light conductive member 2B located far from the spread body 1 progresses to the light conductive member 2A close to the spread body 1, by being reflected on its own optical path conversion means 4, the light 5 is diffused excessively due to the optical path conversion means 4 located at the surface thereof, and the light 5 to progress toward a desired direction is reduced greatly, as a result, it can not illuminate a liquid crystal panel effectively.

What is shown in FIG. 9 shows the optical path conversion means 4 of which is formed by applying a white paint on one portion of the light conductive members 2A, 2B. In this case, the white paint reflects the light 5 in a high reflectance and does not transmit the light 5, therefore, the white paint prevent it from penetrating, and as a result, it functions as a shutter, and if the optical path conversion means 4, 4 of the light conductive members 2A, 2B are located at the same place, the light 5 of the light conductive member 2B which is located far from the spread body 1 is directed toward the light conductive member 2A which is located close to the spread body 1 by being reflected on its own optical path conversion means 4, but it does not progress to the spread body 1 by being reflected on the optical path conversion means 4 applied on its one portion of the light conductive member 2A.

In what is shown in FIG. 10, as an optical path conversion means 4, a prism-shaped portion is formed on one. portion of the surfaces of the light conductive members 2A, 2B. In this case, since the prism-shaped portion refracts the light 5, if the optical path conversion means 4, 4 of the light conductive members 2A, 2B are located at the same place, the light 5 of the light conductive member 2B located far from the spread body 1 progresses to the light conductive member 2A close to the spread body 1 by being reflected on its own optical path conversion means 4, but it progresses in the inappropriate direction in the spread body 1 by being re-refracted with the prism-shaped portion.

In what is shown in FIG. 11, as an optical path conversion means 4, at least one surface of the light conductive members 2A, 2B is formed to be prism-shaped. In this case too, as well as in the case where one portion is prism-shaped, since the prism-shaped portion reflects and refracts the light 5, if the optical path conversion means 4, 4 of the light conductive members 2A, 2B are located at the same place, since the prism-shaped portion first reflects the light 5, the light 5 of the light conductive member 2B is directed to the light conductive member 2A which is located close to the spread body 1 by being refracted by its own optical path conversion means 4, but it progresses in the inappropriate direction in the spread body 1 because it is re-refracted this time by the prism-shaped portion of the surface of the light conductive member 2A.

As mentioned above, although there have been various kinds of optical path conversion means 4, in each of those, if two light conductive members 2 are used in line and inappropriately located, there has been a problem in which a liquid crystal panel is not illuminated effectively because the light 5 of the light conductive member 2B far from the spread body 1 is diffused, reflected or refracted under the influence of the optical path conversion means 4 of the light conductive member 2A close to the spread body 1. The present invention was made in the light of the above problem, in which, if a plurality of light conductive members are in juxtaposition in the same plane of the spread body, and the purpose is to provide a spread illuminating apparatus which does not generate such a problem as a conventional one has.

SUMMARY OF THE INVENTION

In order to solve the above problem, according to a first aspect of the present invention, in a spread illuminating apparatus, wherein a bar-like light conductive member formed with an optical path conversion means on one portion thereof is disposed at one side of a spread body, a light emitting body is disposed at one side of the light conductive member, and the light emitted from the light emitting body illuminates the spread body through the light conductive member, a plurality of said light conductive members are in juxtaposition in the same plane of the spread body, and when seeing perpendicularly to the spread body, the optical path conversion means of the light conductive member which is located close to the spread body and the optical path conversion means of the light conductive means which is located far from the spread body are positioned in such a manner as the lights from the optical path conversion means of the light conductive member which is located far from spread body are not impeded with the optical path conversion means of the light conductive member which is located closed to the spread body.

According to a second aspect of the present invention, in the first aspect, two light conductive members and the spread body are disposed in parallel on a plane and each of the optical path conversion means formed on both of light conductive members close to and far from the spread body respectively is disposed alternately with each other when seeing perpendicularly to the spread body.

According to a third aspect of the present invention, in the first aspect, said optical path conversion means is formed by roughening one portion of the surface of the light conductive member.

According to a fourth aspect of the present invention, in the first aspect, said optical path conversion means is formed by applying a white paint on one portion of the surface of the light conductive member.

According to a fifth aspect of the present invention, in the first aspect, said optical path conversion means is formed on one portion of the surface of the light conductive member by forming it prism-shaped.

According to a sixth aspect of the present invention, in the first aspect, all surface of the light conductive member is formed into prism-shaped.

By constructed as mentioned above, the light from the light conductive member far from the spread body progresses in the spread body without being influenced by the optical path conversion means of the light conductive member close to the spread body.

BRIEF EXPLANATION OF THE DRAWINGS

FIG. 5 is a perspective view of a structure showing how to illuminate the spread body by using a light emitting diode.

FIG. 6 is a perspective view of another structure showing how to illuminate the spread body by using a light emitting diode.

DETAILED DESCRIPTION OF PREFERRED EMBODIMENT

Figure 1:
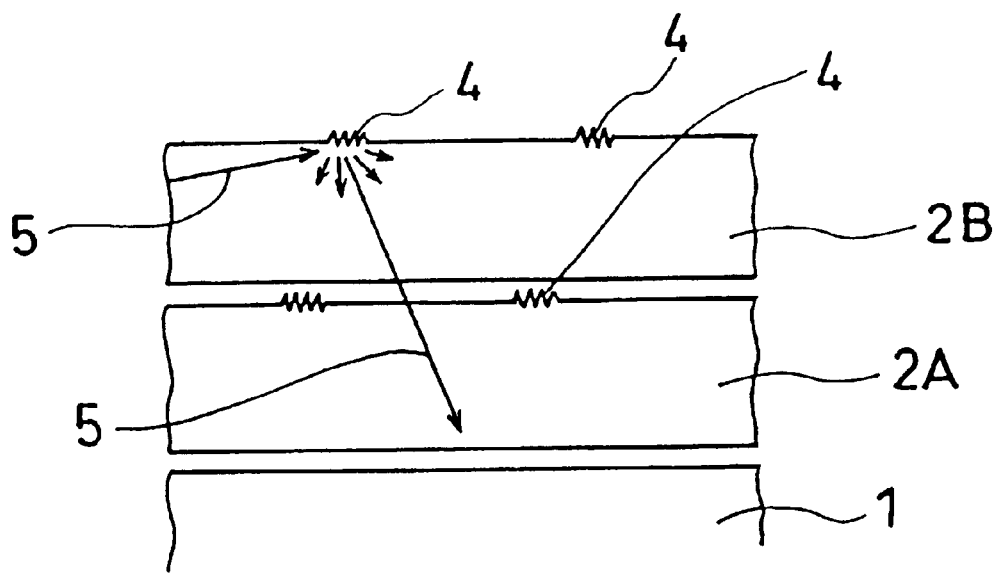
FIG. 1 is for explanation of one embodiment of the present invention.
Figure 2:
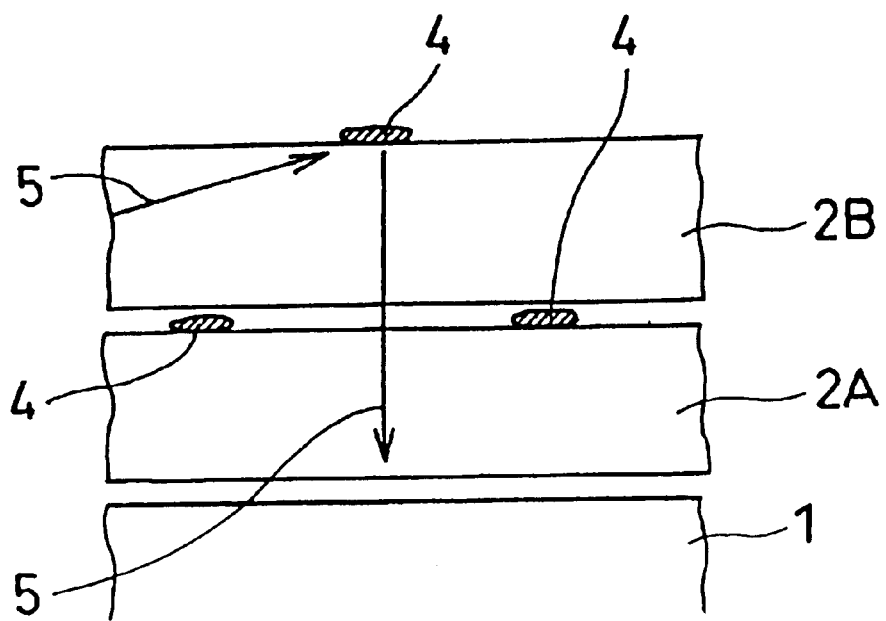
FIG. 2 is for explanation of another embodiment of the present invention.
Figure 8:
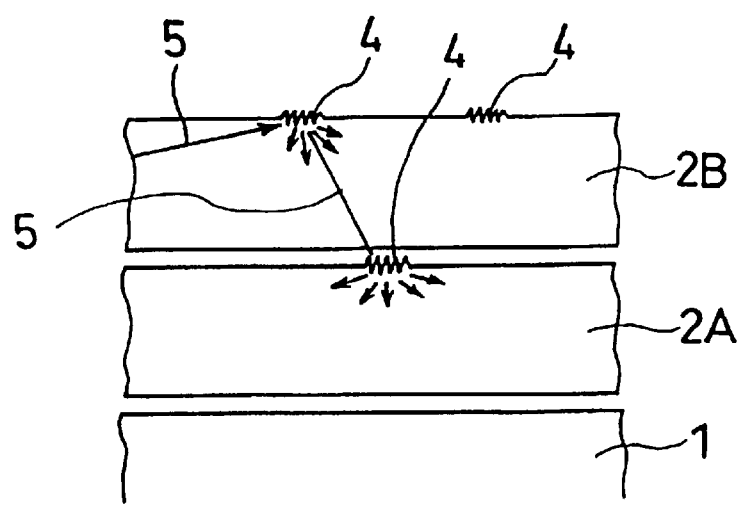
FIG. 8 is for explanation of the function of a conventional one.
Figure 9:
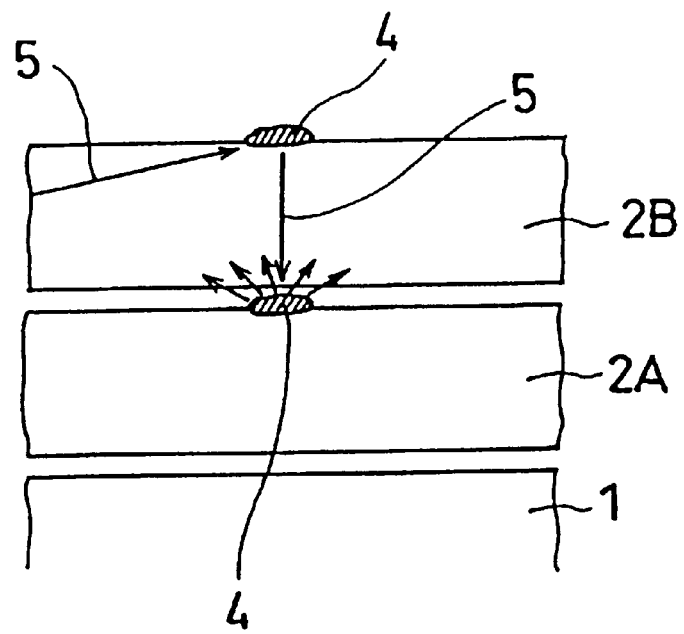
FIG. 9 is for explanation of the function of another conventional one.

Hereinafter, one embodiment of the present invention is explained based on FIGS. 1–4 showing the state of light progressing. In FIG. 1, one improved from what is shown as a conventional one in FIG. 8 is shown, and as an optical path conversion means 4 it is explained that one portion of the surface of the light conductive members 2A, 2B is roughened. Further, what is shown in FIG. 2 is improved from what is shown as a conventional one in FIG. 9, and as an optical path conversion means 4 a white paint is applied to one portion of the surface of the light conductive members 2A, 2B. In every case, when seeing perpendicularly to the side of the spread body 1, the optical path conversion means 4 formed on each of the light conductive member 2B far from the spread body 1 and 2A close to the spread body 1 are adapted to be disposed alternately with each other. Thereby, most of the light 5 which is diffused with the optical path conversion means 4 of the light conductive member 2B is adapted to progress toward the spread body 1 without being reflected with the optical path conversion means 4 of the light conductive member 2A.

Figure 3:
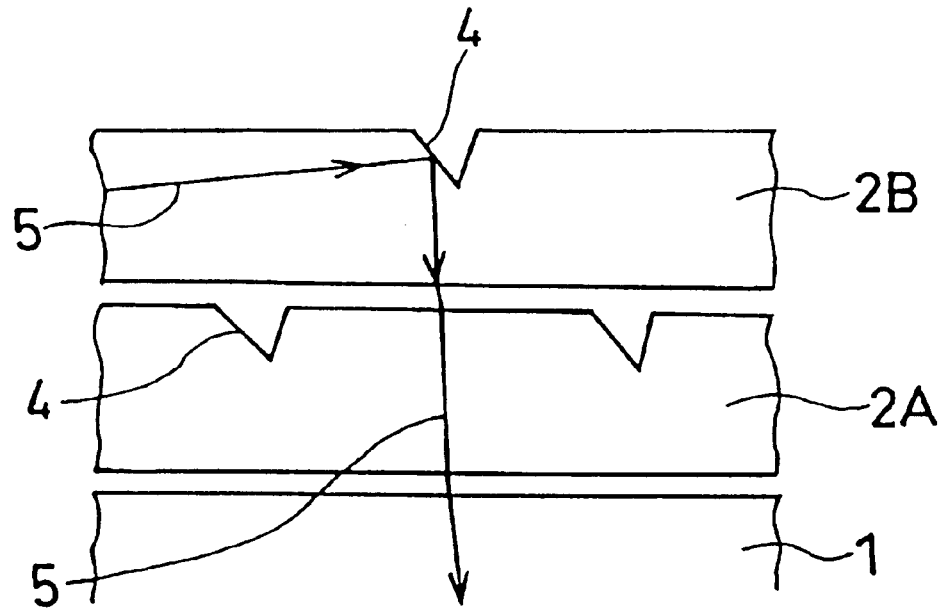
FIG. 3 is for explanation of still another embodiment of the present invention.
Figure 4:
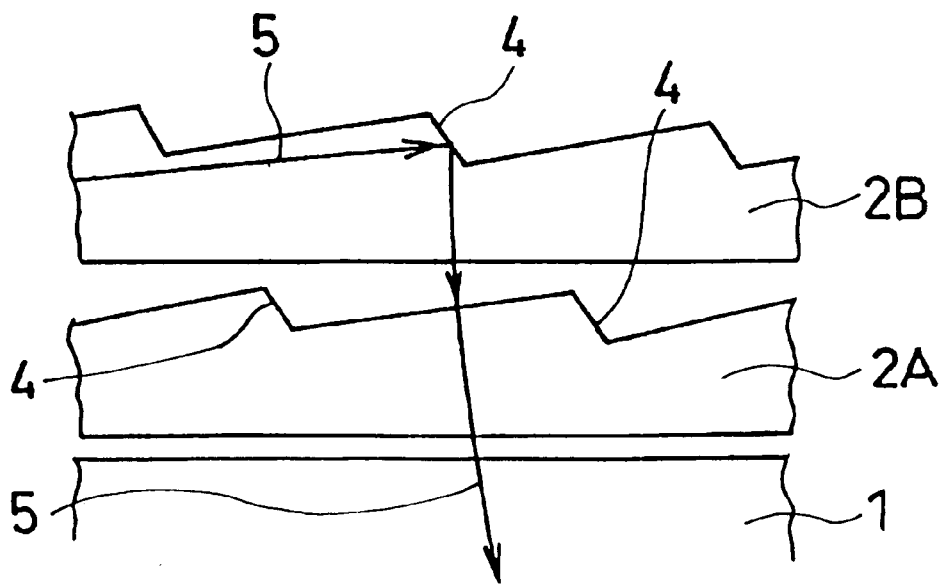
FIG. 4 is for explanation of still another embodiment of the present invention.
Figure 7:
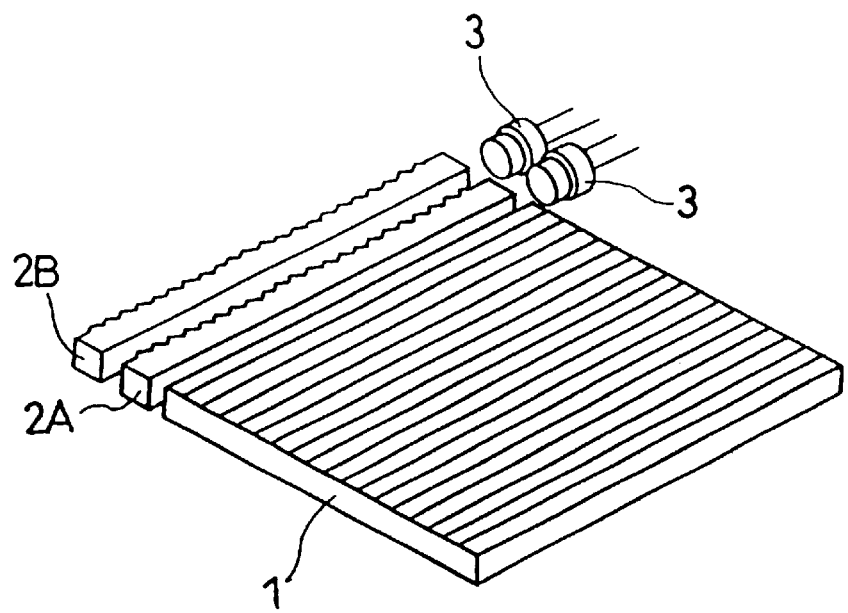
FIG. 7 is a perspective view of still another structure showing how to illuminate the spread body by using a light emitting diode.
Figure 10:
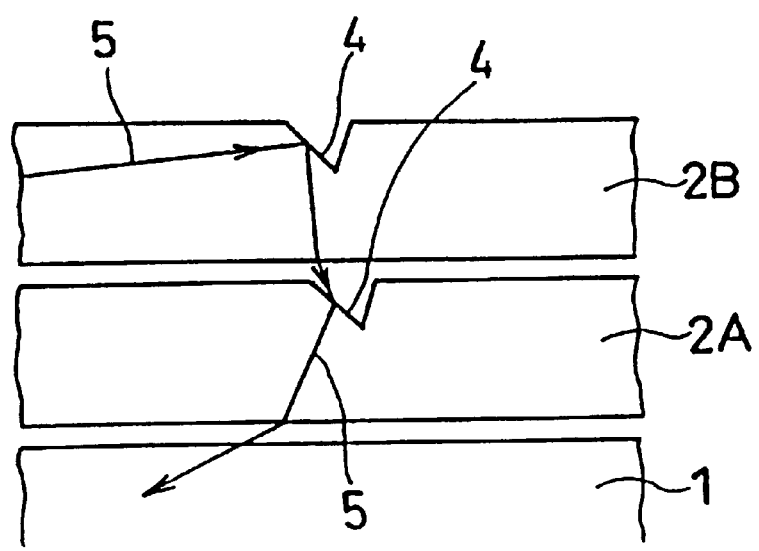
FIG. 10 is for explanation of the function of still another conventional one.
Figure 11:
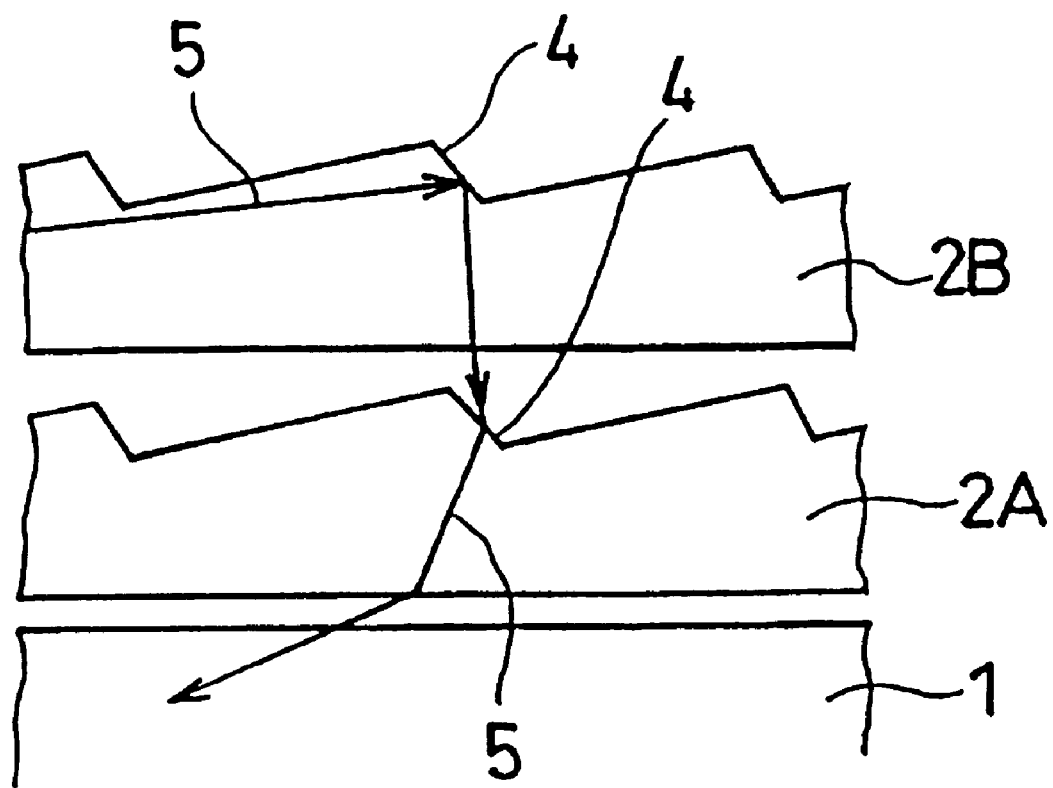
FIG. 11 is for explanation of the function of still another conventional one.

In what is shown in FIG. 3 is what is an improved one from what is shown in FIG. 10 as a conventional one, and as the optical path conversion means 4, prism-shaped portions are formed on one portion of the surfaces of the light conductive members 2A, 2B. Further, what is shown in FIG. 4 is an improved one from what is shown in FIG. 11 as a conventional one, and as the optical path conversion means 4, one surface of the light conductive members 2A, 2B is formed prism-shaped.

In these improvements too, when seeing perpendicularly to the side of the spread body, the optical path conversion means 4 formed on each of the light conductive member 2B far from the spread body 1 and 2A close to the spread body are adapted to be disposed alternately with each other. Thereby, most of the light 5 is adapted to progress toward the spread body 1.

Thus, in each embodiment, the light 5 from the light conductive member 2B which is far from the spread body 1 progresses to the spread body 1 without being influenced by the optical path conversion means 4 provided on the light conductive member 2A which is close to the spread body 1 progresses to the spread body 1. Accordingly, the liquid crystal panel is effectively illuminated.

Since the present invention is a spread illuminating apparatus as explained above, according to the first aspect of the present invention, even if a plurality of the light conductive members are in juxtaposition in the same plane of the spread body, each optical path conversion means is not impeded with each other, and the liquid crystal panel is effectively illuminated.

Further, according to the third to sixth aspects of the present invention, in each different structure of the optical path conversion means, an illumination effect to the spread body is increased.

What is claimed is:

1. A spread illuminating apparatus, characterized in that, in a spread illuminating apparatus, wherein a bar-like light conductive member formed with an optical path conversion means on one portion thereof is disposed at one side of a spread body, a light emitting body is disposed at one side of the light conductive member, and the light emitted from the light emitting body illuminates the spread body through the light conductive member, a plurality of said light conductive members are in juxtaposition in a same plane of the spread body, and optical path conversion means of the light conductive member which is located close to the spread body and optical path conversion means of the light conductive member which is located far from the spread body are positioned in such a manner as the lights from optical path conversion means of the light conductive member which is located far from the spread body are not impeded with the optical path conversion means of the light conductive member which is located close to the spread body.

2. A spread illuminating apparatus according to claim 1, wherein, two light conductive members and the spread body are disposed in parallel in the same plane and each of the optical path conversion means formed on both light conductive members close to and far from the spread body is disposed alternately with each other when seeing perpendicularly to the spread body.

3. A spread illuminating apparatus according to claim 1, wherein said optical path conversion means is formed by roughening one portion of the surface of the light conductive member.

4. A spread illuminating apparatus according to claim 1, wherein said optical path conversion means is formed by applying a white paint on one portion of the surface of the light conductive member.

5. A spread illuminating apparatus according to claim 1, wherein said optical path conversion means is formed by forming one portion of the surface of the light conductive member prism-shaped.

6. A spread illuminating apparatus according to claim 1, wherein all the surface of said light conductive member is formed into prism-shaped.

* * * * *